United States Patent
Yamauchi et al.

(10) Patent No.: US 12,276,750 B2
(45) Date of Patent: Apr. 15, 2025

(54) ON-VEHICLE RADAR APPARATUS

(71) Applicant: DENSO CORPORATION, Kariya (JP)

(72) Inventors: Satoshi Yamauchi, Kariya (JP); Yuuya Sugihara, Obu (JP); Shinngo Miyao, Kariya (JP); Masafumi Ibushi, Kariya (JP)

(73) Assignee: DENSO CORPORATION, Kariya (JP)

( * ) Notice: Subject to any disclaimer, the term of this patent is extended or adjusted under 35 U.S.C. 154(b) by 471 days.

(21) Appl. No.: 17/461,372

(22) Filed: Aug. 30, 2021

(65) Prior Publication Data

US 2021/0389415 A1    Dec. 16, 2021

Related U.S. Application Data

(63) Continuation of application No. PCT/JP2020/008066, filed on Feb. 27, 2020.

(30) Foreign Application Priority Data

Mar. 1, 2019  (JP) ................................. 2019-037820

(51) Int. Cl.
*G01S 7/02*    (2006.01)
*G01S 13/931*  (2020.01)

(52) U.S. Cl.
CPC ............ *G01S 7/028* (2021.05); *G01S 13/931* (2013.01)

(58) Field of Classification Search
CPC ................................. G01S 13/931; G01S 7/23
USPC ........................................................ 342/70
See application file for complete search history.

(56) References Cited

U.S. PATENT DOCUMENTS

| | | | |
|---|---|---|---|
| 9,972,917 B2* | 5/2018 | Vacanti | G01S 13/4463 |
| 2006/0046535 A1 | 3/2006 | Iida | |
| 2006/0238404 A1 | 10/2006 | Ikeda | |
| 2009/0237896 A1 | 9/2009 | Yamauchi | |
| 2011/0107808 A1* | 5/2011 | Gil | B21D 5/14 |
| | | | 72/224 |
| 2012/0119969 A1* | 5/2012 | MacDonald | H01L 23/66 |
| | | | 343/841 |
| 2013/0069320 A1* | 3/2013 | Yanagisawa | H05K 5/0082 |
| | | | 277/628 |
| 2015/0071137 A1* | 3/2015 | Thiam | H01Q 1/521 |
| | | | 343/702 |
| 2015/0097730 A1 | 4/2015 | Pontes | |
| 2016/0104932 A1* | 4/2016 | Aminzadeh | H01Q 5/40 |
| | | | 343/872 |
| 2016/0248151 A1* | 8/2016 | Proshold | H01Q 1/005 |
| 2016/0261034 A1* | 9/2016 | Geise | H01Q 1/422 |

(Continued)

FOREIGN PATENT DOCUMENTS

| | | |
|---|---|---|
| CN | 101325277 A | 12/2008 |
| JP | H06-283918 A | 10/1994 |
| JP | H09-223910 A | 8/1997 |

(Continued)

*Primary Examiner* — James R Hulka
*Assistant Examiner* — Samarina Makhdoom
(74) *Attorney, Agent, or Firm* — Maschoff Brennan (57) ABSTRACT

An on-vehicle radar apparatus according to one aspect of the present disclosure is provided with a first radar antenna pattern unit, a second radar antenna pattern unit, a printed circuit board and a cover. In the cover, both of the first inclined surface and the second inclined surface are inclined closer towards the printed circuit board with increasing distance from the ridge portion.

5 Claims, 6 Drawing Sheets

(56) References Cited

U.S. PATENT DOCUMENTS

2017/0031014 A1* 2/2017 Seidel .................... G01S 13/58

FOREIGN PATENT DOCUMENTS

| JP | 2001-278960 A | 10/2001 | | |
|---|---|---|---|---|
| JP | 2007-189215 A | 7/2007 | | |
| JP | 2007-201868 A | 8/2007 | | |
| JP | 2009-284287 A | 12/2009 | | |
| WO | WO-2018207838 A1 * | 11/2018 | ........... | G01S 13/931 |

* cited by examiner

ON-VEHICLE RADAR APPARATUS

CROSS-REFERENCE TO RELATED APPLICATION

This application is the U.S. bypass application of International Application No. PCT/JP2020/008066 filed Feb. 27, 2020 which designated the U.S. and claims priority to Japanese Patent Application No. 2019-37820, filed Mar. 1, 2019, the contents of which are incorporated herein by reference.

BACKGROUND

Technical Field

The present disclosure relates to an on-vehicle radar apparatus mounted on a vehicle, provided with a radar antenna pattern unit capable of transmitting and receiving electromagnetic waves.

Description of the Related Art

In a field of on-vehicle radar apparatus, a technique is disclosed in which a cover (i.e. radome) is formed in a pyramidal shape where the bottom surface is an antenna opening surface.

Conventionally, according to various radar apparatuses, radar antenna pattern unit mounted on a printed circuit board or the like may be covered by a cover referred as a radome. Further, in this case, a technique is proposed in which the cover is inclined with respect to an antenna opening surface in order to minimize influence of the electronic waves reflected at the cover which are transmitted and received by the radar antenna pattern unit.

SUMMARY

The on-vehicle radar apparatus according to one aspect of the present disclosure is provided with a first radar antenna pattern unit, a second radar antenna pattern unit, a printed circuit board and a cover. The cover is provided with a first inclined surface, a second inclined surface and the second inclined surface and a ridge portion.

DETAILED DESCRIPTION OF THE PREFERRED EMBODIMENTS

In a field of on-vehicle radar apparatus, Japanese Patent Application Laid-Open Publication No. 2009-284287 proposes a technique forming a cover (i.e. radome) in a pyramidal shape where the bottom surface is an antenna opening surface.

Conventionally, according to various radar apparatuses, radar antenna pattern unit mounted on a printed circuit board or the like may be covered by a cover referred as a radome. Further, in this case, a technique is proposed in which the cover is inclined with respect to an antenna opening surface in order to minimize influence of the electronic waves reflected at the cover which are transmitted and received by the radar antenna pattern unit. Thus, phases of the reflected waves reflected at the cover towards the antenna opening surface becomes different depending on the locations and reflected waves are mutually cancelled, thereby minimizing the influence of the reflected waves.

However, as a result of detailed research of the inventors, as disclosed by the above-described patent literature 1, when forming the cover in a pyramid shape, a problem has been found in which the electromagnetic waves are disturbed when passing through the side edge or the apex. In other words, in the case where portions of which the angle with respect to the electromagnetic waves on the cover surface rapidly changes are present in a region where the electromagnetic waves pass through, the electromagnetic waves passing through the portions are disturbed. In the case where the electromagnetic waves transmitted by the radar antenna pattern unit are thus disturbed or the electromagnetic waves thus disturbed are received by the radar antenna pattern unit, it is possible that an increase in the detection accuracy of the on-vehicle radar apparatus for detecting an object will be deteriorated.

Hereinafter, with reference to the drawings, embodiments of the present disclosure will be described.

First Embodiment

[1-1. Configuration]

Figure 1:
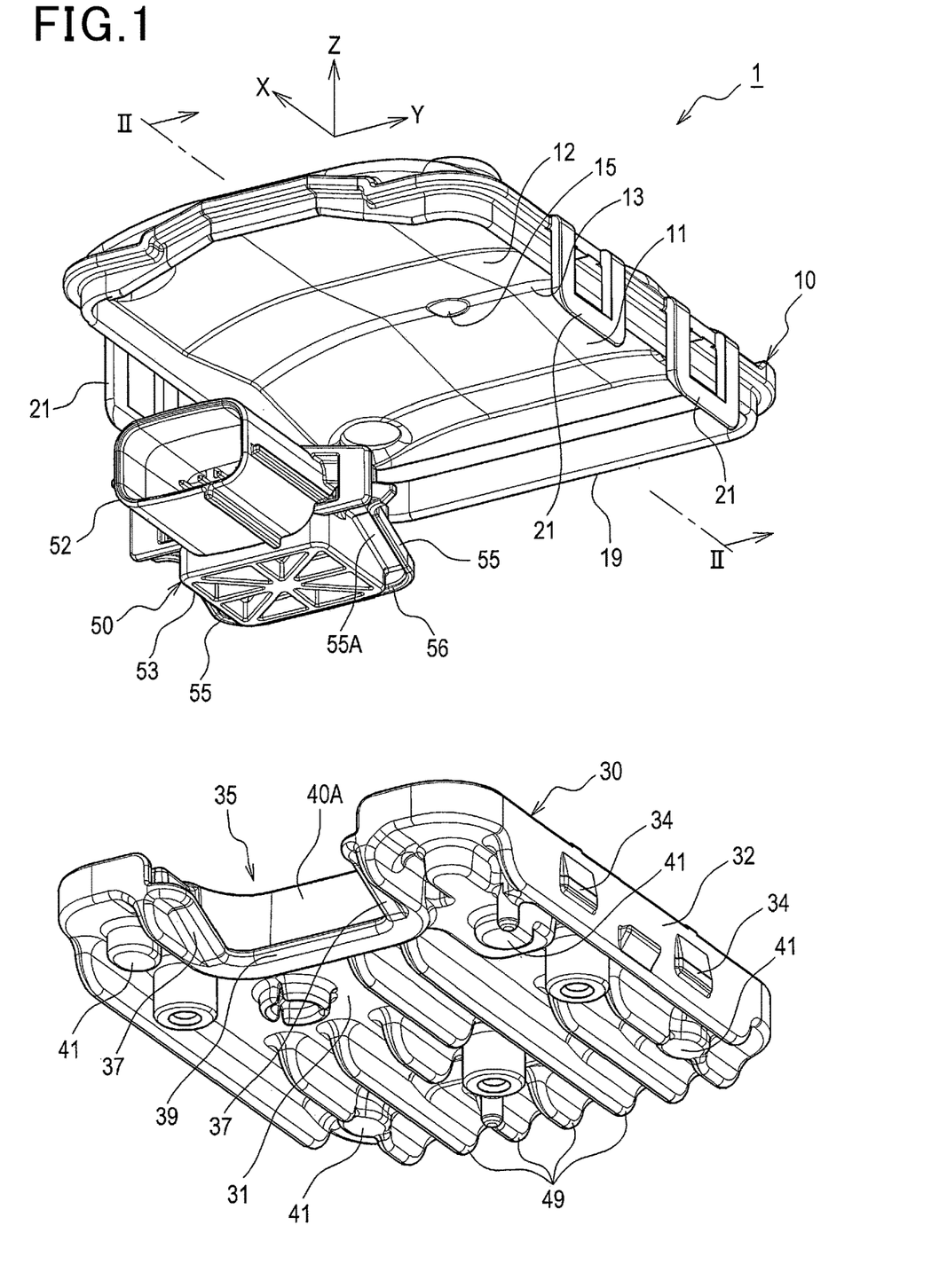
FIG. 1 is an exploded perspective view showing a configuration of an on-vehicle radar apparatus according to an embodiment.

As shown in FIG. 1, an on-vehicle radar apparatus 1 according to an embodiment is provided with a cover 10 (i.e. upper case), a case (i.e. lower case) and a connector 50. In the following description, a right-handed coordinate system is defined in which +Z direction is a direction towards the cover 10 from the case 30 and +X direction is a direction where the connector 50 protrudes from the cover 10 and the case 30 in a state where the on-vehicle radar apparatus 1 is assembled. Note that these directions are defined for sake of convenience in order to simply explain a positional relationship between respective portions which constitute the on-vehicle radar apparatus 1. In the case where the on-vehicle radar apparatus 1 is actually utilized, the orientation of the on-vehicle radar apparatus 1 may be arbitrarily set. For example, the on-vehicle radar apparatus 1 may be disposed such that +Z direction is towards the upper side, or may be disposed such that the +X direction is towards the upper side, and may be disposed having other postures.

Figure 2:
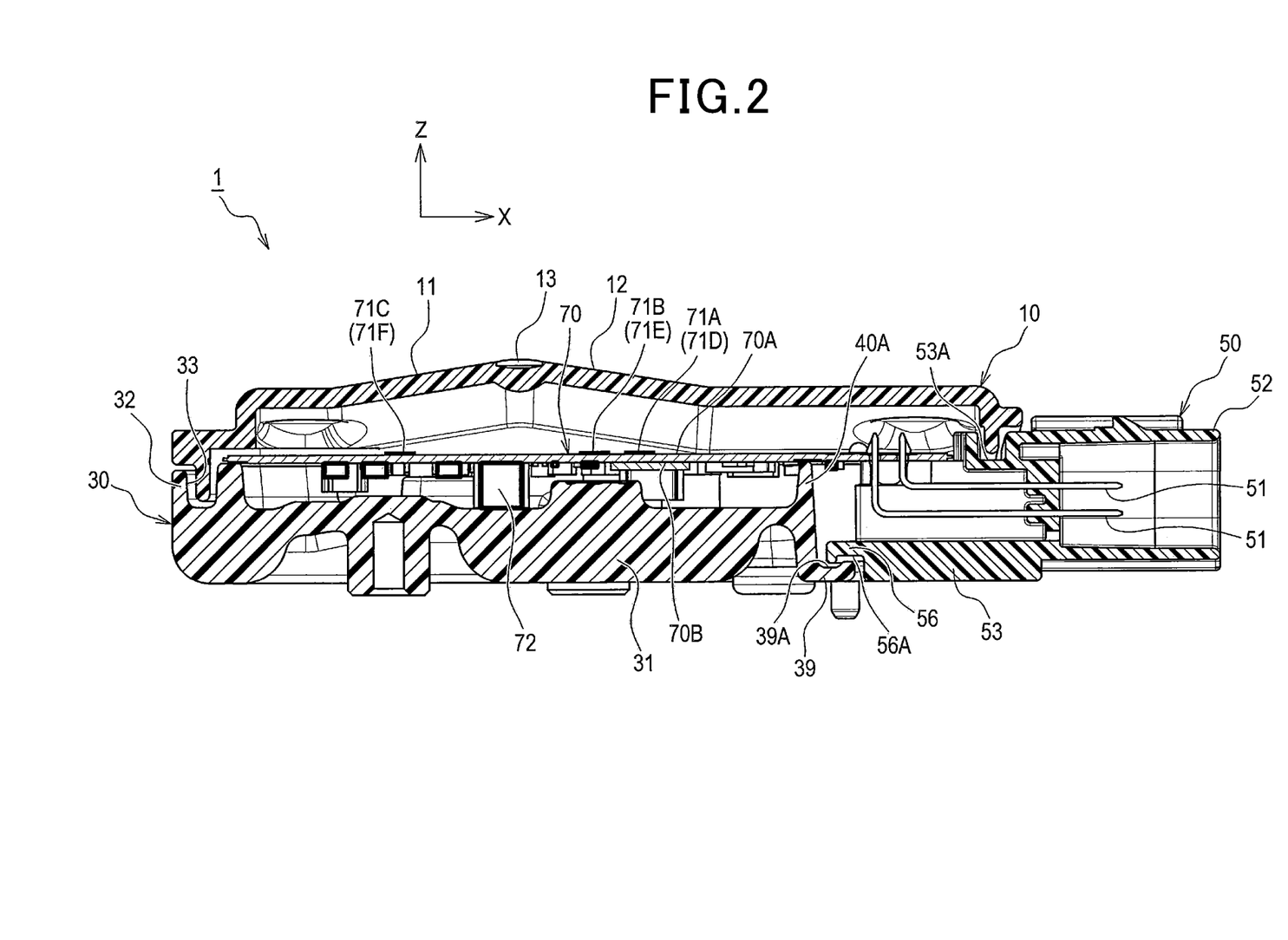
FIG. 2 is a cross-sectional view sectioned along II-II line showing of the embodiment.
Figure 3:
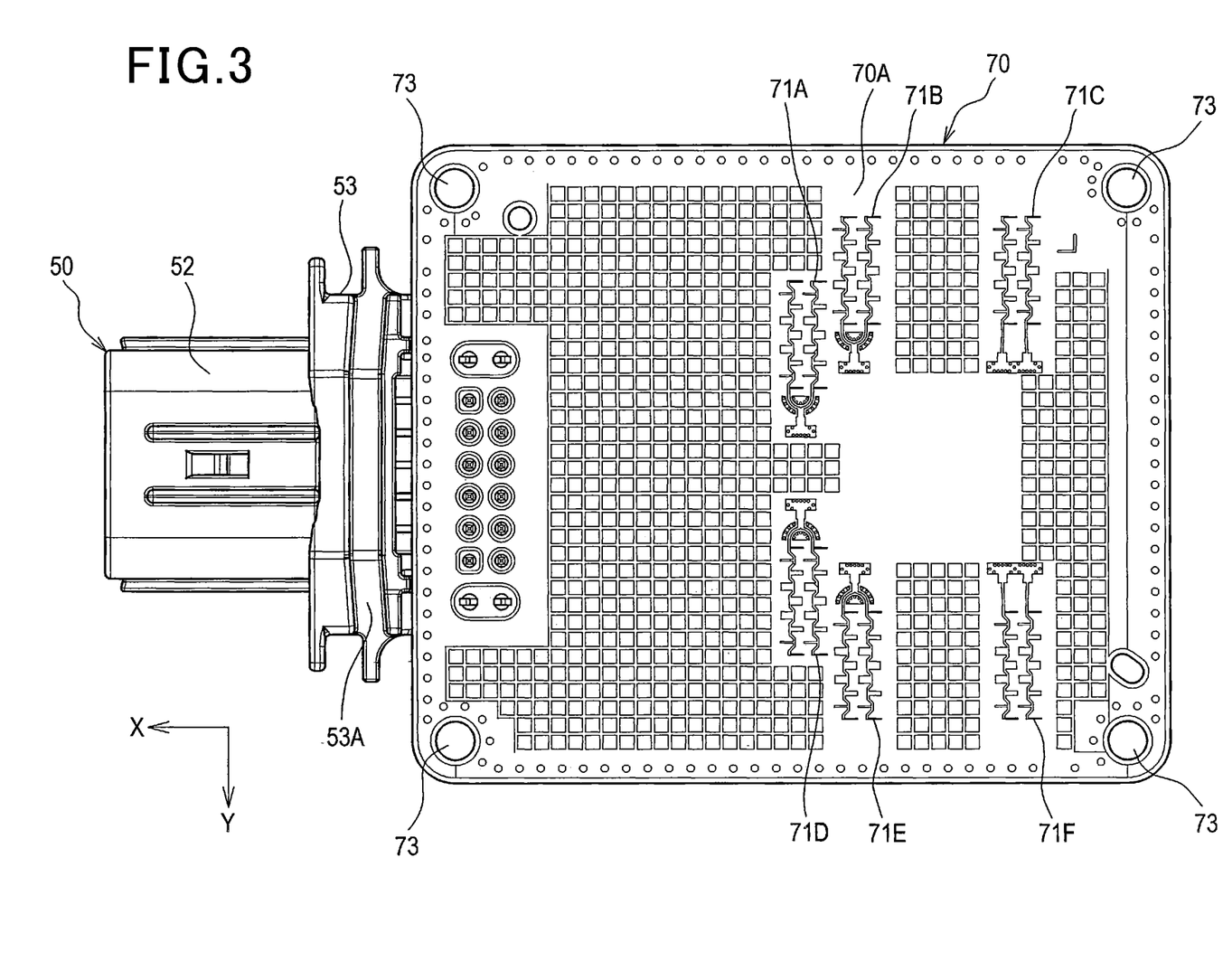
FIG. 3 is a plan view showing a printed circuit board and a connector in the on-vehicle radar apparatus according to the embodiment.
Figure 4:
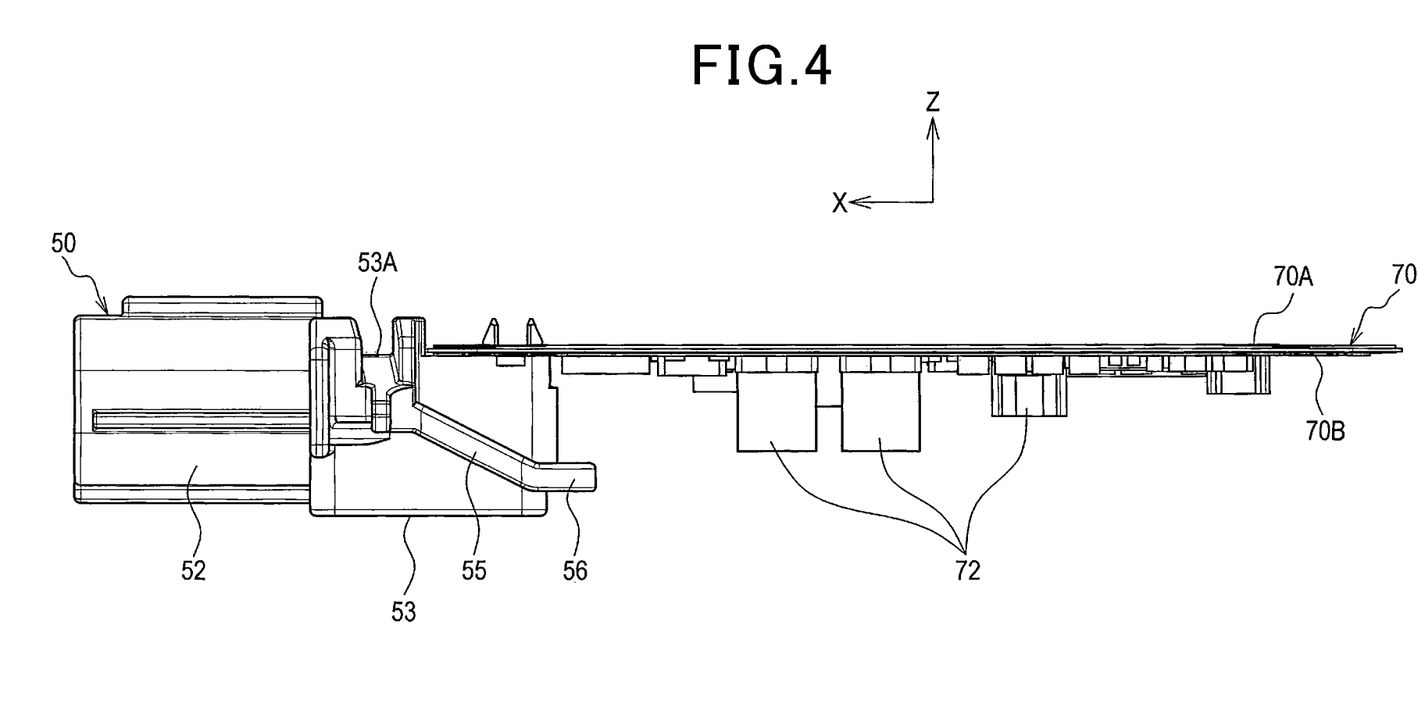
FIG. 4 is a side view showing a configuration of the printed circuit board and the connector.

As shown in FIGS. 2 to 4 which will be described later, the connector 50 is mounted on a second surface 70B of a printed circuit board 70 including radar antenna pattern units 71A to 71F on a first surface 70A thereof by a soldering such as a reflow soldering. The cover 10 is provided with a first inclined surface 11 and a second inclined surface 1 which are mutually inclined in the opposite direction. The first surface 11 and the second surface 12 allow electromagnetic waves which are transmitted and received by the radar antenna pattern units 71A to 71F to pass therethrough, and the cover 10 serves as a radome. Note that the first inclined surface 11 and the second inclined surface 12 being mutually inclined in the opposite direction refers to a case where both of the first inclined surface and the second inclined surface are inclined closer towards the printed circuit board 70 with increasing distance from a ridge portion 13 at which the first inclined surface 11 and the second inclined surface 12 cross each other.

The radar antenna pattern units 71A to 71F are arranged to be in parallel each other. Among these radar antenna pattern units 71A to 71F, the radar antenna pattern unit 71C and 71F serves as a transmission radar antenna pattern unit and overlap with the first inclined surface in +/−Z direction. The electromagnetic waves transmitted by the radar antenna pattern unit 71C and 71F pass through the first inclined surface 11 and does not pass through the ridge portion 13. The radar antenna pattern units 71A, 71B, 71D, 71E serve as reception radar antenna pattern units and overlap with the second inclined surface in +/−Z direction. The electromagnetic waves received by the radar antenna pattern units 71A, 71B, 71D and 71E pass through the second inclined surface 12 and doers not pass through the ridge portion 13. A control unit 72 is mounted on the second surface 70B of the printed circuit board 70 for controlling the electromagnetic waves which are transmitted and received via the radar antenna pattern units 71A to 71F. For the control unit 72, various configurations can be applicable. For example, a unit provided with a microcomputer, a power supply, and various electronic components such as an amplifier circuit can be applicable.

As shown in FIG. 13, the ridge portion 13 is provided at a portion in the cover 10 which is farthest from the printed circuit board 70 in the +Z direction. The first inclined surface 11 and the second inclined surface 12 are inclined closer to the printed circuit board 70 with increasing distance from the ridge portion 13. In the center of the ridge portion 13, a gate 15 is provided as a position where a resin was injected into a mold when the cover 10 was injection-molded. The cover 10 may be manufactured by a method other than the injection-molding. When the cover 10 is injection-molded, a thermo plastic resin is used to manufacture the cover 10. The thermo plastic resin may be a resin reinforced by a glass fiber or the like.

Figure 5:
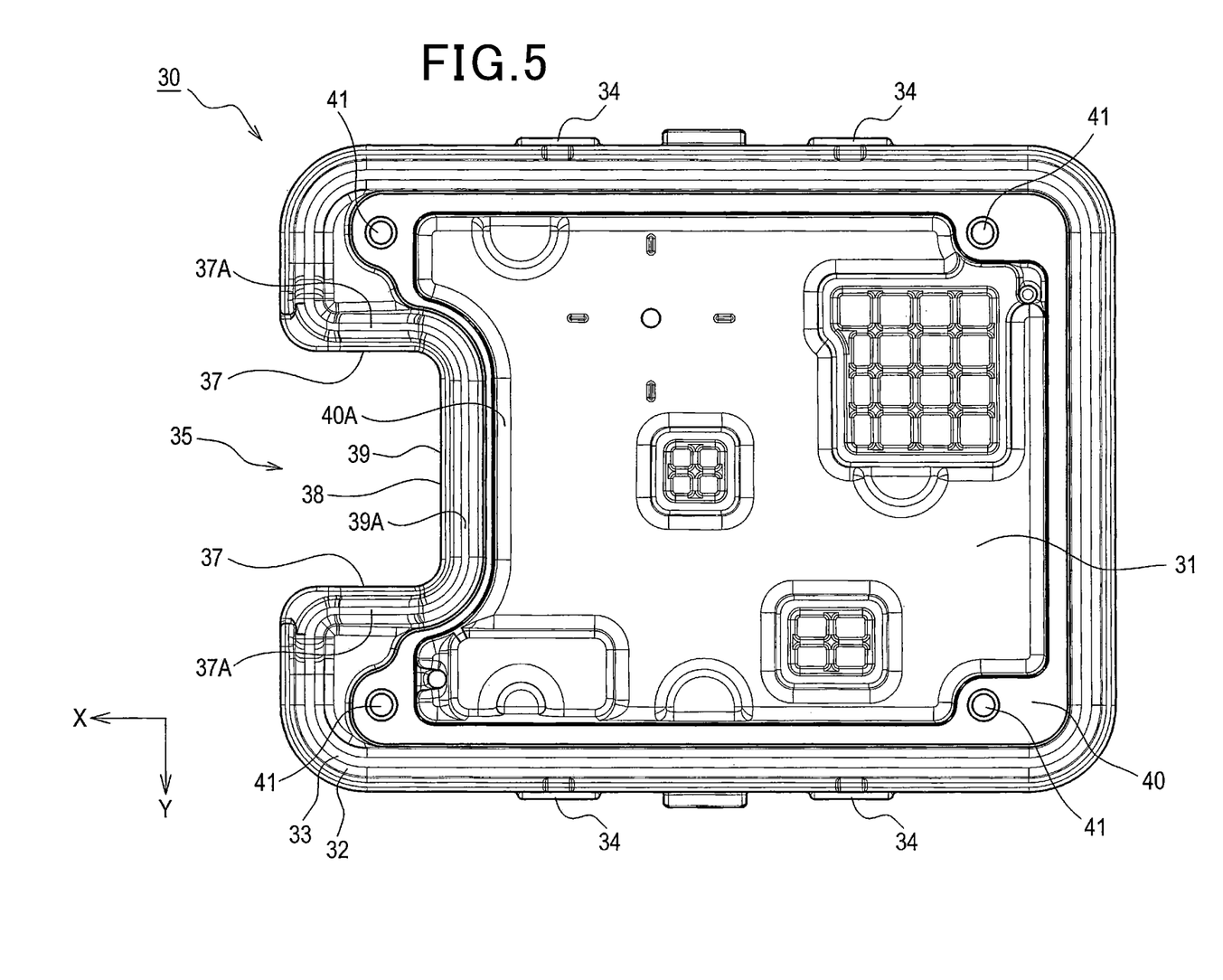
FIG. 5 is a plan view showing a configuration of a casing in the on-vehicle radar apparatus according to the embodiment.

Referring back to FIG. 1, the cover 10 is formed in a rectangular shape when viewing in −Z direction. In a periphery portion of the cover 10, a flange portion 19 is continuously formed extending in the −Z direction. The case 30 includes a base portion 31 formed in a rectangular shape when viewed from the −Z direction. In a periphery portion of the base portion 31, a wall portion 32 extending in the +Z direction is continuously formed excluding a connector receiving portion 35 which will be described later. As shown in FIGS. 2 and 5, a groove portion 33 is continuously formed in a tip end (i.e. +Z side end portion) of the wall portion 32. Note that a −Z side end portion in the flange portion 19 engages with the groove portion 33. The case 30 may be made of any materials. For example, the case 30 may be made of metal, specifically made of aluminum. The case 30 may be constituted of resin. However, the flame retardant grade may preferably be V1 or larger in order to further favorably exhibit effects of a wall portion 40A which will be described later.

Also, in an outer peripheral surface of the flange portion 19 corresponding to a first long side and a second long side of the cover 10 (each long side in the rectangular shape when viewed from the −Z direction), two rectangular shaped flames 21 are formed extending in the −Z direction. In a portion where each frame 21 reaches when the flange portion 19 of the cover 10 engages with the groove portion 33, a hook 34 engaging with the frame 21 from inside is formed on an outer peripheral surface of the wall portion 32. These four hooks are each engaged with the frame 21, whereby the cover 10 is coupled to the case 30 in a so-called snapfit manner.

The case 30 is provided with a connector receiving portion 35 in the center of the short side of the +X side (i.e. short side of +X side in the rectangular shape when viewed from −Z direction) which is cutout towards the center of the case 30 (i.e. −X direction). The connector receiving portion 35 is formed having a large enough size capable of receiving at least a base portion 53 that supports a hood portion of the connector 50. Note that the hood portion 52 is configured as a part of the connector 50, formed in a cylindrical shape surrounding a portion of the terminal 51 of the connector 50 to be connected to other equipment, and configured to be capable of connecting to a connector of the other equipment. In FIG. 1, for the sake of convenience, illustration of the terminal 51 and the printed circuit board 70 is omitted. Those shapes and a positional relationship are shown in FIGS. 2 and 3.

A flange portion 37 is formed to support the connector 50 at each inner wall surface in both sides of the connector receiving portion 35 in +/−Y direction. For this flange portion 37, a flange portion 55 is formed at each outer peripheral surface in both sides of the base portion 53 in the +/−Y direction.

As shown in FIG. 4, a surface of the flange portion 55 supported by the flange portion 37 constitutes an inclined surface extending towards +Z direction as it goes towards the +X direction from vicinity of −Z side end portion at −X side end portion of the base portion 53. Also, a surface of the flange portion 37 supporting the flange portion 55 is similarly inclined.

Figure 6:
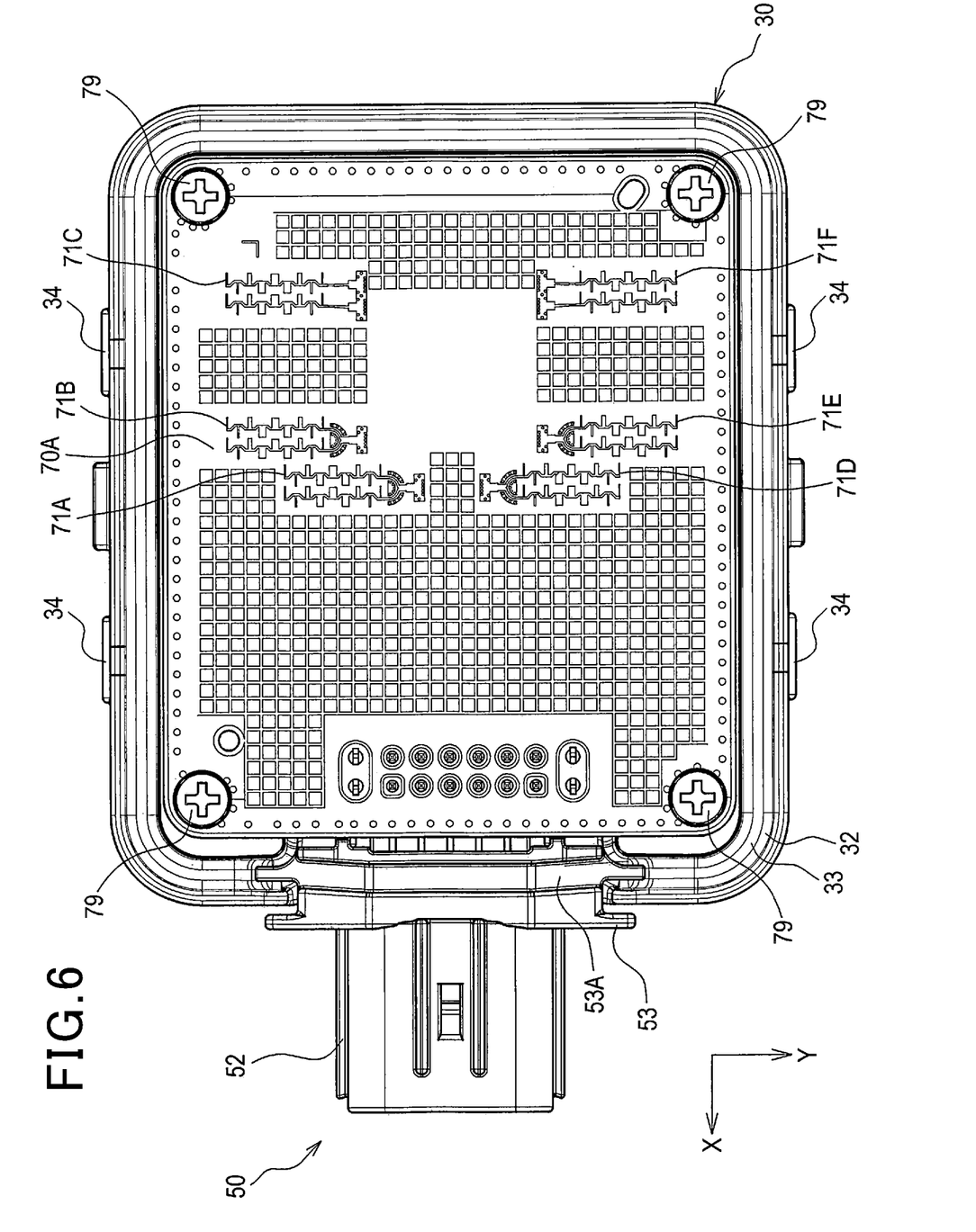
FIG. 6 is a plan view showing an assembled state of the casing and the connector in the on-vehicle radar apparatus according to the embodiment.

Further, as shown in FIG. 5, a support base 40 is formed continuously at a peripheral portion in the base portion of the case 30 (i.e. base part of the wall portion 32) to support the printed circuit board 70 at a portion floating from the base portion 31 (i.e. portion away from the printed circuit board 31 in +Z direction). In the support base 40, a plurality of screw holes 41 as female screw holes are formed corresponding to a plurality of screw through holes 73 as through holes of the printed circuit board. As shown in FIG. 6, the screw 79 is screwed to the screw through hole 73 to engage with the screw hole 41, whereby the printed circuit board 70 can be attached to the case 30.

When the printed circuit board 70 is thus attached to the case 30, the hood portion 52 of the connector 50 attached to the printed circuit board 70 described above, is exposed in the +X direction from the connector receiving portion 35 towards outside the on-vehicle radar apparatus 1. At this moment, the flange portion 55 of the connector 50 comes into contact with the flange portion 37 of the connector 50.

Further, as shown in FIGS. 2 and 5, a portion close to the connection receiving portion 35 in the support base 40 is configured as a thin wall portion 40A which extends in the +Z direction. According to this configuration, the wall portion 40A isolates the path from electronic components constituting the control unit 72 to the connector 50. Hence, if the electronic components constituting the control unit 70 catch fire, the wall portion 40A prevents the fire from spreading to the connector 50 received by the connector receiving portion 50 or outside the on-vehicle radar apparatus 1.

Further, as shown in FIG. 2, the terminal 51 of the connector 50 extends to inside the base portion 53 from inside the hood portion 52 along an axis of the hood portion 52, then the terminal 51 is bent in the base portion 53 to be in an L-shape, and soldered on the printed circuit board 70 during the mounting as described above.

With this soldering, an axial direction of the hood portion 52 (i.e. direction where the terminal 51 to be connected to other equipment is extended towards the other equipment, which corresponds to the direction of the connector 50) is maintained at a direction parallel to the second surface 70B of the printed circuit board 70. The maintenance of this direction is accomplished by an effect in which the base portion 53 mechanically contacts with the second surface 70B to support the hood portion 52 on the printed circuit board 70, cooperated with an effect of the above-described soldering. The direction of the connector 50 thus maintained is −X direction when the printed circuit board 70 is attached to the case 30 by the screw 79 as described above.

Also, as shown in FIG. 1, a single flange portion 39 is formed at a +X side surface of the wall portion 40A (i.e. −X side inner wall surface in the connector receiving portion 35), to support a single flange portion 56 provided at the −X side outer peripheral surface in the base portion 53. Note that the flange portion 56 is connected to two flange portions 55 at −X side end portions thereof. Similarly, the flange portion 39 is connected to two flange portions 37 at −X side end portions thereof. Further, a fin 49 is formed at −Z side outer peripheral surface of the case 30 in order to radiate heat produced by the control unit 72 or the like.

Further, as shown in FIG. 5, a groove portion 37A capable of accepting a sealing material is formed on a surface of the flange portion 37 which is opposite to the flange portion 55. Similarly, a groove portion 39A capable of accepting a sealing material is formed on a surface of the flange portion 39 which is opposite to the flange portion 56. These groove portions 37A and 39A are coupled to the above-described groove portion 33. Also, as shown in FIG. 1, a groove portion 55A capable of accepting a sealing material is formed on a surface of the flange portion 55 which is opposite to the flange portion 37. Similarly, a grove portion capable of accepting a sealing material which is not shown is formed on a surface of the flange portion 56 which is opposite to the flange portion 39. Moreover, the above-described groove portion 33 and the flange portion 19 are designed to be fitted having a gap between the inner wall surface of the groove portion 33 and the outer peripheral surface of the flange portion 19, and the gap being capable of receiving the sealing material. Further, as shown in FIG. 6, a groove portion 53A is formed on +Z side outer peripheral surface of the base portion 53 in the connector 50, the groove portion 53A being coupled to the groove portion 33 in both sides in the +/−Y direction when mounting to the case 30.

Therefore, in the case where sealing material is coated to the above-described grove portions 33, 37A, 39A and 53A, thereafter, the cover 10 and case 30 are coupled by the snapfit manner, the printed circuit board 70 accommodated in the housing constituted of the case 30 and the cover 10 is appropriately prevented from being exposed to water. In other words, the cover 10 covers the printed circuit board 70 from a portion opposite to the case 30 and is connected to the case 30, whereby the cover 10 cooperating with the case 30 surround the printed circuit board 70 with high waterproof property.

[1-2. Effects and Advantages]

According to the above-described embodiment and modification example thereof, the following effects and advantages can be obtained.

(1-A) The first inclined surface 11, which is provided in a region where the electromagnetic waves transmitted by the radar antenna pattern units 71C and 71F pass through, is inclined with respect to the first surface 70A on which the radar antenna pattern units 71C and 71F are mounted. Hence, an influence of a reflection at the cover 10 to electromagnetic waves transmitted by the radar antenna pattern units 71C, 71F can be minimized. The second inclined surface 12, which is provided in a region where the electromagnetic waves to be received by the radar antenna pattern units 71A, 71B, 71D and 71E pass through, is inclined with respect to the first surface 70A. Hence, an influence of a reflection at the cover 10 to electromagnetic waves received by the radar antenna pattern units 71A, 71B, 71D and 71E can be minimized.

(1-B) The first inclined surface 11 and the second inclined surface 12 are inclined closer to the printed circuit board 70 with increasing distance from the ridge portion 13 at which the first inclined surface 11 and the second inclined surface 12 cross each other. Accordingly, the outline of the cover 10 shows a roof shape, and the housing size of the on-vehicle radar apparatus 1 can be reduced and the mountability of the on-vehicle radar apparatus 1 to the vehicle can be enhanced.

(1C) Further, the ridge portion 13 at which the first inclined surface 11 and the second inclined surface 12 cross each other is a portion (i.e. edge) of which the angle with respect to the electromagnetic waves on the surface of the cover 10 rapidly changes. The ridge portion 13 is provided in the following manner. That is, the ridge portion 13 is provided at a portion excluding a region where the electromagnetic waves transmitted by the radar antenna pattern units 71C and 71F pass through and also excluding a region where the electromagnetic waves received by the radar antenna pattern units 71A, 71B, 71D and 71E pass through. Hence, the electromagnetic waves transmitted by the radar antenna pattern units 71C and 71F and the electromagnetic waves received by the radar antenna pattern units 71A, 71B, 71D and 71E can be prevented from being disturbed when passing through the cover 10.

(1D) In the center of the ridge portion 13, a gate 15 is provided as a portion where a resin was injected into a mold when the cover 10 was injection-molded. According to the present embodiment, the cover 10 is produced by injection-molding with a resin, and the gate 15, as a position where the resin is injected, is disposed at the ridge portion 13. Hence, the first inclined surface 11 and the second inclined surface 12 can be stably molded, and then the cover 10 can be stably molded. Note that even when the gate 15 is disposed at a portion outside the center of the ridge portion 13, for example, disposed in the vicinity of any end portions in the ridge portion 13, the effects of stably molding the cover 10 can be obtained. However, in the case where the gate 15 is disposed in the center of the ridge portion 13, or at least a portion closer to the center of the ridge portion 13 than both ends of the ridge portion, the cover 10 can be more stably molded.

(1E) Further, when the gate 15 is thus disposed at the ridge portion 13, if the resin used for insert-molding of the cover 10 is a fiber reinforced plastic, the orientation of the fiber becomes equivalent between the first inclined surface 11 and the second inclined surface 12, thereby more stabilizing the shape of the cover 10. In this case, the fiber contained in the fiber-reinforced plastic may not be necessarily glass fiber, for example, the fiber may be carbon fiber, edible fiber or natural fiber. However, the fiber contained in the fiber-reinforced plastic is a glass fiber, the shape of the cover 10 is more stabilized. Further, in the case where the fiber contained in the fiber-reinforced plastic is a glass fiber, characteristics related to a travel of electromagnetic waves are possibly different between the glass fiber and the polymer around the glass fiber. However, as described, the orientation of the fiber is equivalent, the characteristics of the on-vehicle radar apparatus 1 can be prevented from being fluctuated.

(1F) According to the on-vehicle radar apparatus 1, the ridge portion 13 disposed at a portion excluding a region where the electromagnetic waves transmitted or received by the radar antenna pattern units 71A and 71F pass through, is formed in a plate-like shape. Hence, the size of the housing of the on-vehicle radar apparatus 1 is further reduced and the mountability of the on-vehicle radar apparatus 1 to the vehicle can be further enhanced.

[1-3. Correspondence with Scope of Claims]

In the above-described embodiments and the modification thereof, the radar antenna pattern units 71C and 71F correspond to first radar antenna pattern unit. The radar antenna pattern units 71A, 71B, 71D and 71E correspond to second radar antenna pattern units.

OTHER EMBODIMENTS

Embodiments of the present disclosure is described so far. The present disclosure is not limited to the above-described embodiments but may be modified in various manners and embodied.

(2A) According to the above-described embodiment, the ridge portion 13 is formed in a plate-like shape, but the shape of the ridge portion is not limited thereto. The ridge portion 13 may be formed to have a cylindrical surface shape projected outside, that is, may be formed to have so called curved shape. In the case where the ridge portion 13 is formed to have a curved shape, edge portions are mostly removed so that a disturbance of electromagnetic waves may be further reduced.

(2B) The shapes of respective portions disclosed in the above-described embodiment are not limited thereto. For example, the printed circuit board may be formed in a disk shape or a triangular shape or other shapes.

(2C) Multiple functions of a single component in the above-described embodiment may be implemented by multiple components, and a single function of a single component may be implemented by multiple components. Moreover, multiple functions of multiple components may be implemented by a single component, and a single function implemented by multiple components may be implemented by a single component. Further, some of the configurations of the above-described embodiment may be omitted. In addition, at least some of the configurations of the above-described embodiment may be added to or replaced with the configurations of the other embodiments described above.

CONCLUSION

One aspect of the present disclosure provides an on-vehicle radar apparatus capable of minimizing an influence of a reflection at the cover, reducing the size of a housing thereby enhancing a mountability to the vehicle, and preventing electromagnetic waves transmitted and received by the radar antenna pattern unit from being disturbed when passing through the cover.

The on-vehicle radar apparatus according to one aspect of the present disclosure is provided with a first radar antenna pattern unit, a second radar antenna pattern unit, a printed circuit board and a cover. The cover is provided with a first inclined surface, a second inclined surface and the second inclined surface and a ridge portion.

The first radar antenna pattern unit is configured to transmit electromagnetic waves. The second radar antenna pattern unit is configured to receive electromagnetic waves. The printed circuit board includes the first radar antenna pattern unit and a second radar antenna unit mounted on the first surface thereof. The cover is configured to cover the printed circuit board from a first surface side.

The first inclined surface is provided in a region where the electromagnetic waves transmitted by the first radar antenna pattern unit pass through, and inclined with respect to the first surface. The second inclined surface is provided in a region where the electromagnetic waves transmitted by the second radar antenna pattern unit pass through, and inclined with respect to the first surface. The ridge portion is provided at a portion excluding a region where the electromagnetic waves transmitted by the first radar antenna pattern unit pass through and also excluding a region where the electromagnetic waves received by the second radar antenna pattern unit pass through. The ridge portion is a portion at which the first inclined surface and the second inclined surface cross each other. The first inclined surface and the second inclined surface are inclined closer to the printed circuit board with increasing distance from the ridge portion.

According to such a configuration, the first inclined surface provided at a region where electromagnetic waves transmitted by the first radar antenna pattern unit pass through is inclined with respect to a first surface on which the first radar antenna pattern unit is mounted. Hence, the influence of reflection at the cover on electromagnetic waves transmitted by the first radar antenna pattern unit can be minimized. Further, since the second inclined surface provided at a region where electromagnetic waves received by the second radar antenna pattern unit pass through is inclined with respect to the first surface, the influence of reflection at the cover to electromagnetic waves received by the second radar antenna pattern unit can be minimized.

Moreover, both of the first inclined surface and the second inclined surface are inclined closer to the printed circuit board with increasing distance from the ridge portion at which the first inclined surface and the second inclined surface cross each other. Hence, the outline of the cover has a roof shape such that the housing size of the on-vehicle radar apparatus according to the present disclosure is reduced and the mountability of the on-vehicle radar apparatus to the vehicle can be enhanced. Further, the ridge portion at which the first inclined surface and the second inclined surface cross each other is a portion of which the angle with respect to the electromagnetic waves on the cover surface rapidly changes. The ridge portion is provided in the following manner. That is, the ridge portion at which the first inclined surface and the second inclined surface cross each other is provided at a portion outside a region where the electromagnetic waves transmitted by the first radar antenna pattern unit pass through and also excluding a region where the electromagnetic waves received by the second radar antenna pattern unit pass through. Therefore, electromagnetic waves transmitted by the first radar antenna pattern unit and electromagnetic waves received by the second radar antenna pattern unit can be prevented from being disturbed.

What is claimed is:

1. An on-vehicle radar apparatus comprising:
   a first radar antenna pattern unit configured to transmit electromagnetic waves;
   a second radar antenna pattern unit configured to receive electromagnetic waves;

a printed circuit board in which the first radar antenna pattern unit and the second radar antenna pattern unit are mounted on a first surface thereof; and a cover configured to cover the printed circuit board from a side of the first surface, wherein the cover includes:

a first inclined surface provided in a region where electromagnetic waves transmitted by the first radar antenna pattern unit pass through, and inclined with respect to the first surface;

a second inclined surface provided in a region where electromagnetic waves received by the second radar antenna pattern unit pass through, and inclined with respect to the first surface; and a ridge portion at which the first inclined surface and the second inclined surface cross each other, and the ridge portion provided at a portion of the cover that is outside of a region where the electromagnetic waves transmitted by the first radar antenna pattern unit pass through and also outside a region where the electromagnetic waves received by the second radar antenna pattern unit pass through, the ridge portion comprising an edge at which the angle with respect to the electromagnetic waves on the cover rapidly changes, and both of the first inclined surface and the second inclined surface are inclined closer towards the printed circuit board with increasing distance from the ridge portion, wherein the cover is produced by injection-molding with a resin; and a gate as a portion where a resin is injected into a mold during the injection-molding is provided at the ridge portion, the gate provided at the portion of the cover that is outside of the region where the electromagnetic waves transmitted by the first radar antenna pattern unit pass through and also outside the region where the electromagnetic waves received by the second radar antenna pattern unit pass through.

2. The on-vehicle radar apparatus according to claim 1, wherein the gate is disposed at a portion closer to a center of the ridge portion than both ends of the ridge portion.

3. The on-vehicle radar apparatus according to claim 1, wherein the resin is a fiber-reinforced plastic.

4. The on-vehicle radar apparatus according to claim 3, wherein fiber contained in the fiber-reinforced plastic is a glass fiber.

5. The on-vehicle radar apparatus according to claim 1, wherein the ridge portion is formed in a plate-like shape.

* * * * *